(12) United States Patent
Jury

(10) Patent No.: US 7,922,068 B2
(45) Date of Patent: Apr. 12, 2011

(54) WELDING RAILWAY LINES

(76) Inventor: Brent Felix Jury, Waitara (NZ)

( * ) Notice: Subject to any disclaimer, the term of this patent is extended or adjusted under 35 U.S.C. 154(b) by 0 days.

(21) Appl. No.: 12/743,230

(22) PCT Filed: Nov. 21, 2008

(86) PCT No.: PCT/NZ2008/000316
§ 371 (c)(1),
(2), (4) Date: May 15, 2010

(87) PCT Pub. No.: WO2009/067029
PCT Pub. Date: May 28, 2009

(65) Prior Publication Data
US 2010/0243715 A1     Sep. 30, 2010

(30) Foreign Application Priority Data
Nov. 22, 2007  (NZ) ........................ 563648

(51) Int. Cl.
*B23K 31/02* (2006.01)
*B23K 1/06* (2006.01)
(52) U.S. Cl. .................. 228/234.3; 228/110.1
(58) Field of Classification Search .......... None
See application file for complete search history.

(56) References Cited

U.S. PATENT DOCUMENTS

| | | | | |
|---|---|---|---|---|
| 6,131,801 A | * | 10/2000 | Hagen | 228/234.3 |
| 6,207,920 B1 | * | 3/2001 | Morlock | 219/54 |
| 2006/0016858 A1 | * | 1/2006 | Statnikov et al. | 228/101 |

FOREIGN PATENT DOCUMENTS

| | | | |
|---|---|---|---|
| CN | 101372068 A | | 2/2009 |
| GB | 2383413 A | | 6/2003 |
| JP | 10-237803 A | * | 9/1998 |
| JP | 2001-333023 A | * | 11/2001 |
| JP | 2004-300898 A | | 10/2004 |
| JP | 2005-118871 A | | 5/2005 |
| JP | 2007-175707 A | | 6/2007 |
| JP | 2008-274414 A | | 11/2008 |
| JP | 2008-274745 A | * | 11/2008 |
| WO | WO 97/04291 A | | 2/1997 |

* cited by examiner

*Primary Examiner* — Kiley Stoner
(74) *Attorney, Agent, or Firm* — Bio Intellectual Property Services LLC; O. M. (Sam) Zaghmout

(57) ABSTRACT

This invention relates to a thermite welding process for joining sections of a railway line in situ, the process including the preliminary step of mounting a suitable welding mould about the aligned sections of railway line to be welded together and sealing the mould to prevent run out; mounting a vibration means on the railway line at a suitable distance from the mould and operating it at a suitable frequency; heating the sections of railway line to a desired temperature; igniting an ignitor means and allowing it to drop into the mould to react with molten steel in the mould and fill a weld area about and between the sections of railway line in the mould; and when solidified, to vibrate the railway line for a further period of time until stress relieving of the cast weld area has occurred.

10 Claims, 1 Drawing Sheet

WELDING RAILWAY LINES

TECHNICAL FIELD

Figure 1:
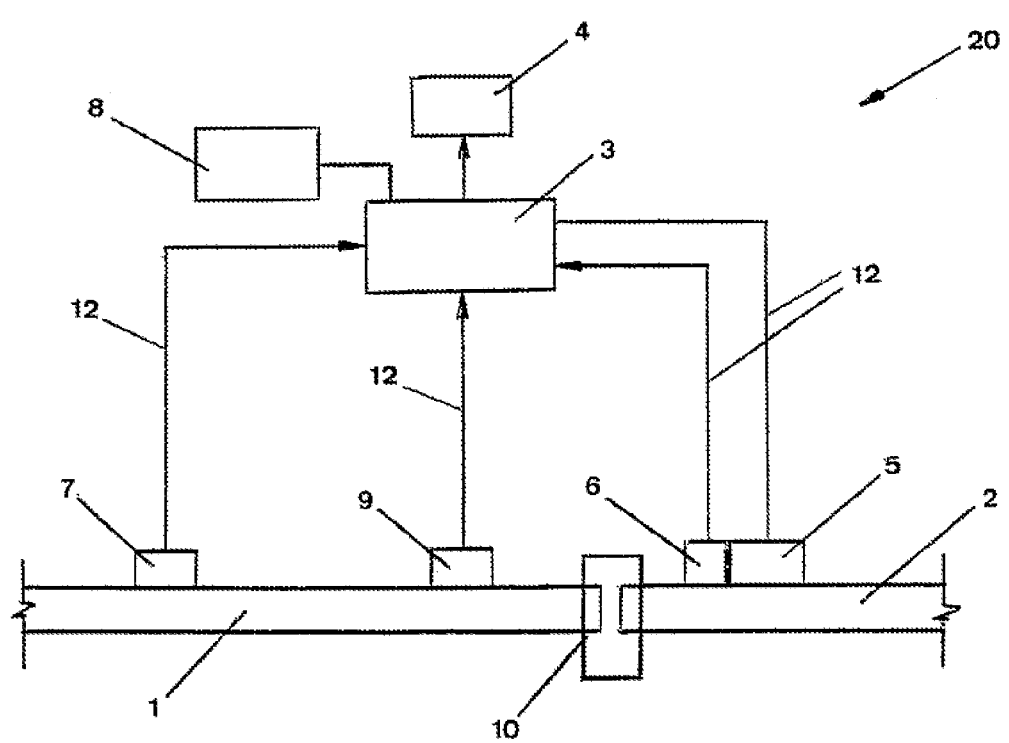

This invention relates to joining railway lines. More particularly, but not exclusively, the present invention relates to improving thermite welds applied to join sections of railway line.

BACKGROUND ART

Railway lines are generally made of high carbon steel as it is considered to be a suitably durable material. As some railway lines endure extreme weather environments that can rapidly expand or compress lines along with heavy axle loadings, even these high carbon steel lines suffer the risk of cracking, buckling and joint failures from time to time. The consequences of track failure can lead to catastrophic derailments leading to loss of life and damage to property. Therefore, the integrity of railway lines is considered to be essential for the safe carriage of persons and property across countries.

The repairing of cracks and defective or failed joints in railway lines poses a major problem for railway companies. One method of repairing a failed line is to cut a section of line on either side of the defective area, thus requiring welding two joints when inserting the replacement section of railway line into the track. This type of repair work is time consuming and can result in potentially weak and defective weld joints if the work is not carried out properly.

It has been a challenge to maintain the integrity of railway lines in recent years, particularly when lines are subjected to various stresses and strains imposed from trains having a heavy axle loading. The techniques for joining and rejoining sections of railway line have come under intense focus and pressure in recent years as a result of rail and weld failures, and concerns over the reliability of track repairs is being further compounded by the heavier loads trains are exerting on railway lines.

One way of repairing a railway line is by applying an aluminothermic or thermite type welding process. However, these thermite type weld joints can result in a lower strength weld compared with other methods and there is a perceived higher risk of weld failure with this type of process. These failures can be caused by sub-standard welding and due to the fact the such welds can be difficult to check for integrity and thus it is not uncommon for such welds, in some instances, to be defective. However, this form of welding a railway line does have its desirable properties, and the present invention seeks to improve the integrity of such welds.

It is a non-limiting object of the invention to provide an improved thermite weld process for joining ends of a railway line which overcomes at least some of the abovementioned problems, or at least to provide the public with a useful choice.

SUMMARY OF THE INVENTION

According to a broad aspect of the invention there is provided a thermite welding process for joining aligned and adjacent sections of a railway line, the process including the preliminary step of mounting a suitable thermite welding mould about suitably aligned and prepared sections of railway line to be welded together, and sufficiently sealing the mould so as to prevent run out, the steps of the process including:

(a.) configuring and attaching a vibration apparatus on the railway line such that a vibration means is mounted on a section of railway line at a suitable distance from the weld area, and vibrating the line at a suitable frequency of vibration and amplitude of vibration, such vibration being induced on the railway line being preset and/or adjustable during the welding process by a vibration control means configured and adapted to measure the frequency of vibration and the amplitude of vibration being applied to the line, the control means being adapted to allow adjustments to the frequency of vibration and the amplitude of vibration;

(b.) the sections of railway line together using a thermite welding process including preheating the weld area to a suitable temperature, igniting the ignitor means to cause a reaction in the mould and allow molten steel to fill a weld area about and between the sections of railway line in the mould; and (c.) continuing to apply vibration to the sections of railway line and the weld area for a period of time sufficient to allow the weld area to solidify and stabilise and until stress relieving of the weld area has occurred.

Optionally in step a. the vibration frequency is set between about 50 to 800 Hertz. More preferably the vibration frequency is set between about 70 and 80 Hertz.

Desirably in step a. the vibration apparatus includes a vibration means being a motor having eccentric weights applied to the shaft of the motor, the motor being clampable to a section of railway line adjacent the weld area and being arranged, in use, so as to allow vibration to be induced on the railway line.

Preferably the frequency of vibration is measured by a tachometer means being releasably attachable to the railway line.

Preferably the amplitude of vibration is measured by an accelerometer means being releasably attachable to the railway line, the tachometer means and the accelerometer means being adapted to provide feedback signals to the vibration control Desirably the vibration apparatus includes a temperature measurement means to measure the temperature of the railway line.

Preferably the vibration frequency is set at an amplitude of vibration of substantially about 1 millimeter per second.

Advantageously in step c. the period of vibration applied to the weld area is up to about 25 to 30 minutes after solidification of welding material in the weld area.

Preferably the vibrating means is mounted to the railway line at a distance of between about 1 meter to about 1.2 meters from the weld area.

Optionally the preliminary step the ends of the sections of railway line are prepared by using a gas torch to cut a substantially square cut and suitably aligned to form a gap of between 25 to 40 millimeters between the end faces of the sections of railway line.

Desirably the thermite welding process for joining aligned and adjacent sections of a railway line includes the preliminary step of mounting a suitable thermic welding mould about the aligned sections of railway line to be welded together and sealing the mould to prevent run out yet allowing the thermic welding process to be activated; mounting a vibrating means on the railway line at a suitable distance from the mould and operating it at a suitable frequency; pre-heating the weld area of the sections of railway line to a desired temperature; igniting an ignitor means and allowing it to drop into the mould to react with molten steel in the mould and fill a weld area about and between the sections of railway line in the mould; and when solidified, to vibrate the railway line for a further period of time until stress relieving of the cast weld area has occurred.

It will be appreciated that the amplitude of vibration can vary depending on the proximity to the weld area and to avoid breaking a seal around the mould and therefore it is provided as a non-limiting example only of one possible value of the amplitude of vibration.

BRIEF DESCRIPTION

Preferred and alternative embodiments of the invention will now be illustrated, by way of non-limiting example only, with reference to the accompanying drawing in which:

FIG. 1: Shows a schematic view of vibration apparatus 20 or an arrangement of components for vibrating sections of railway line according to a preferred embodiment of the invention.

DETAILED DESCRIPTION

Referring to the figure, a vibration apparatus 20, in an arrangement of components for vibrating sections of a railway line 1,2 during thermite welding according to a non-limiting preferred embodiment of the invention, is illustrated and described in detail.

It is common practice in the industry, and commonly accepted in the industry, that sections of railway line should be left undisturbed during and most certainly after the thermite welding process has just been made, and this includes not moving or adjusting the lines until total solidification has occurred over a considerable period of time. Therefore, this invention teaches away from such practice as it seeks to vibrate and therefore essentially move and disturb the sections of railway line 1, 2 during and after the welding process has taken place.

A steel railway line generally includes a carbon content, and in many installations, a railway line is formed of a high carbon steel. It is seen in this process that the vibration may serve to control the movement of carbon in the steel structure during the welding process that is a desirable attribute of the unique process.

Standard thermic welds on railway lines can be problematic as the cast weld can be riddled with porosity, and in some cases gross porosity and surface cavities. It is this porosity in the thermic weld that can increase the likelihood of failure as it can cause weakness in the weld.

Advantageously, it has been found that the welding method of the present invention can reduce porosity and return some elasticity to the metal structure of the lines 1, 2. Furthermore, the process can desirably improve the mechanical strength of the thermic weld area when compared to a thermic weld area not subjected to the process of the invention. It may be seen then that the welding process of the present invention can increase the quality of the thermic weld.

The welding process of the invention advantageously involves a method for the application of controlled vibration to sections of a railway line 1, 2 undergoing an aluminothermic or thermite type welding process.

In FIG. 1, the two sections of the railway line 1,2 are prepared and aligned end to end. Proper alignment of the adjoining sections of line 1, 2 to be welded will be done by any known and suitable method. The weld area between the ends of the sections of line 1,2 is diagrammatically shown in a box 10. Preferably the ends are cut with a gas torch or otherwise to form a desirable set up form to allow the mould to be mounted about and adjacent the ends of the lines 1,2. The faces of the ends of the sections of line 1,2 to be joined are generally square and the gap between the lines 1, 2 is typically about 25 to 30 mm in many applications, but may be between about 25 to 80 mm, although it will be appreciated by one skilled in the art that the gap can be up to about 100 mm or so.

It is accepted that different moulds can be employed depending on the gap or distance between the end faces of sections of line 1,2 and the rail profiles or otherwise as preferred. The moulds may be two or three piece, stepped, and may be composite moulds such as in applications involving mismatched rail profiles. The thermite moulds are generally pre-fabricated one shot moulds, and one skilled in the art will be capable of selecting a suitable mould 10 for use in the method of the invention.

Suitable vibration equipment or apparatus is set up on the line to supply a constant and suitable vibration and the ends of the railway line 1,2 are optionally retained in a secured and aligned position as required. This set up may be with the sections of line 1,2 in a clipped and fixed and aligned position on railway sleepers in situ, or undertaken at a remote location. In this respect it will be appreciated that the method of the invention is not limited to location but may be adapted and configured to be completed on a railway line in situ if required.

The vibration apparatus desirably includes a controlled source of vibration including a control means 3 in the form of a computer means including a microprocessor suitably programmed to control the operation of the vibration equipment. A suitable display means 4 associated with the control means 3 is desirably used to allow an operator to read measurements, and a display means 4 can assist in ensuring a suitable frequency, amplitude of vibration and duration of vibration is applied during the welding process to carry out the operation of the invention.

The control means 3 can function to control each step of the vibration process. The control means 3 can desirably be powered by any power supply means 8 and when used remotely can be powered by any suitable and durable portable battery means or power generator means (not shown) for remote testing on railway lines away from an available electrical power source and to allow the vibration apparatus to be used for portable applications. Desirably a rechargeable power supply means can be configured and arranged with components of the vibration apparatus.

The vibration apparatus desirably includes a vibration means 5 that can be mounted by any known and suitable securing means, such as for example releasably attachable clamp, to an appropriate position of the railway line, such as, for example in one non-limiting application, between 50 centimeters to 1.2 meters, and more desirably about 50 centimeters from the weld point. The vibration means 5 is desirably in the form of a motor adapted with a vibration inducement means optionally in the form of eccentric weights mounted to the motor shaft and configured to apply a vibration to the line. It is considered that the force as applied is adjustable such that the amplitude of vibration and the frequency of vibration can be increased or decreased as required. The vibration means 5 may include an exciter or shaker unit, as it is known in the art, that is desirably controlled by a user controlling and adjusting the speed of the motor. The motor can be controlled by being associated with the control means 3.

The motor speed of the vibration means can be sensed using any known form of motor speed measuring means and in this embodiment is in the form of a tachometer 6 that can be mounted to the shaft of the motor 5. The tachometer 6 measures the shaft speed and the measured signal outputs are fed to the control means 3.

The amplitude of vibration induced on a section of railway line 1,2 is typically about 1 mm/second although more or less measure of amplitude may be employed. The amplitude of vibration can be sensed and measured using a signal measuring means in the form of a transducer means, desirably an accelerometer 7. It will be appreciated that any suitable and known vibration measuring instrument may be applied.

The accelerometer 7 generates an electrical signal in response to the vibration acceleration of the railway line as induced by the vibration means 5, and provides a signal that is fed to the control means 3. The control means 3 is configured and arranged desirably to convert the signals into a measurement of frequency of vibration for display on the display means 4.

A temperature measurement means 9 is optionally and desirably used to measure the temperature of the sections of line 1,2 during operation. The temperature measurement means 9 is desirably in the form of a pyrometer and provides measurement signals to the control means 3 that allows the temperature of the line to be advantageously tagged against other recorded data at the time of operation of the vibration apparatus.

The display means 4 can be provided to display the plotted measurements of velocity amplitude (for example, in mm/second) against the frequency of vibration and any other desirable characteristics of the data obtained during operation of the vibration apparatus during and/or after the welding operation. The control means 3 can desirably include a suitable microprocessor means with a storage means to store recorded data.

It is seen, and will be appreciated by one skilled in the art, that the main components of the vibration apparatus are desirably interconnected by cables 12. However, some of the cables can be replaced by wireless communication devices or means for components adapted with a suitable transmitter and/or receiver means, and such wireless communication means may be particularly useful for measurement and sensing devices as the accelerometer 7 and/or the pyrometer 9 and/or the tachometer 6 that are configured and arranged to provide measured data for processing by the control means 3, as required.

The vibration equipment or apparatus is configured and arranged to allow a user to apply a constant vibration to sections of the railway line 1 and/or 2 at any suitable frequency of vibration that may be substantially between about 50 to 800 hertz (Hz). More preferably the frequency is suitably set at between about 70 to 80 Hz. In this respect it is considered that the lower frequency should desirably be set at least about 55 Hz.

The application of controlled vibration is based on an arrangement of components on a railway line on which an aluminothermic welding process using a steel casting technique will take place. This specification hereby incorporates all known and published techniques and methods and specifications associated with aluminothermic welding to date and wherein it is accepted by one skilled in the art of aluminothermic welding that factors such as a predetermined gap between lines to be joined; a predetermined preheat temperature including the volume of gas and a predetermined time period; and a predetermined weld portion in the cast, including a predetermined type and volume of weld material, are applied during the course of an aluminothermic weld.

It will also be appreciated by one skilled in the art that the criteria for achieving a high quality aluminothermic weld can vary depending on rail conditions, and in that respect the pre-heating process can vary as required.

Further, the quality of the weld may be increased by casting metal in the mould with similar properties to the rail steel, in particular with similar strength and hardness properties.

It is seen then in a summary of the process of the invention that the thermite welding process for joining aligned and adjacent sections of a railway line, involves the preliminary step of mounting a suitable thermite welding mould 10 about the aligned and prepared sections of railway line 1, 2 to be welded together and sealing the mould 10 to prevent run out, the steps of the process including step a.) of configuring and attaching a vibration apparatus on the railway line such that a vibration means in the form of a vibration means 5 is mounted on a section of railway line at a suitable distance from the weld area, and vibrating the line at a suitable frequency of vibration and amplitude of vibration, such vibration being induced on the railway line being preset and/or adjustable during the welding process by a vibration control means 3 configured and adapted to measure the frequency of vibration and the amplitude of vibration being applied to the line, the control means 3 being adapted to allow adjustments to the frequency of vibration and the amplitude of vibration; and in step b.) then welding the sections of railway line together using a thermite welding process including preheating the weld area to a suitable temperature, igniting the ignitor means to cause a reaction in the mould and allow molten steel to fill a weld area about and between the sections of railway line in the mould; and then in step c.) continuing to apply a controlled vibration to the sections of railway line and the weld area for a period of time sufficient to allow the weld area to solidify and stabilise, and until stress relieving of the weld area has occurred.

EXAMPLE A

One non-limiting example of the aluminothermic or thermite type welding process utilising the vibration apparatus 20 and process of the invention is as follows:

Firstly the preliminary step is taken of a suitable welding gas torch or cutter or grinder being applied to the weld area to make or form a square cut or other suitable formation such as a shallow V shape or parallel angled cut at the end faces of the sections of railway line 1,2 to be joined. The railway lines 1, 2 are then properly and suitably aligned end to end, and leave a gap between the sections of line 1,2 of about generally about 25 mm to 40 mm, more or less, as desired and required.

Then a suitable thermite welding mould 10 is mounted about the aligned end sections of railway line 1,2 to be welded together, and the mould is sealed to prevent molten metal from escaping from the mould 10 during the welding process.

In accordance with step a. of the process, the vibration apparatus as described above with reference to FIG. 1 is configured and arranged on the sections of railway line 1,2 ready for use. The vibration means 5 located on the railway line at a suitable distance, in this non-limiting example, of about 1 meter to about 1.2 meters, from the mould 10 and is set to operate at a suitable frequency between 50 and 500 Hz, and more preferably is set to vibrate at a frequency of between 70 to 80 Hz. It may be suitably operated at an amplitude of vibration of substantially about 1 mm/second. The vibration apparatus is operated at a predetermined frequency and controlled vibration is induced on the lines 1,2.

Then in accordance with step b., the mould 10 is fitted with known pre-heating equipment suitable for the purpose, and pre-heating occurs to a desirable temperature and then the ignitor means is ignited allowing it to drop into the mould to react with a predetermined quantity of molten steel placed in the mould. When a reaction occurs the molten steel will pour and fill the targeted weld area. This usually takes about 30 seconds.

The molten steel then solidifies, and the railway line, according to step c., is vibrated continuously for a further period of time until stress relieving of the weld area has occurred. This period of time may be for about 25 to 30 minutes or for such further time as required to allow for solidification and stabilisation of the weld.

After the process is complete the mould can be removed, and the weld cleaned and ground to form the final desired profile about the weld area. It is also considered to be desirable to induce a suitable vibration on the railway line while final grinding is applied to form the final profile in the and about the head rail portion of the railway line.

It is anticipated that the cast thermic weld will be improved by being strengthened as a result of the method of the invention, and further, it can be seen that the porosity of the weld can be advantageously lowered, thus reducing the likelihood of cracking or failure of the weld and joint.

It is considered that the vibration may well be changing the thermodynamic properties of the weld area and sections of line 1, 2. The application of vibration may also be increasing the conductivity of the sections of line 1,2 and be improving the effective heat dissipation during the welding process.

It will be appreciated that in circumstances where the sections of line 1,2 being joined are of different grades of steel, the welding procedures and consumables employed are those specified for the harder grade of railway line being welded.

It will also be appreciated that the process of the invention can be applied to sections of railway line 1,2 in situ or to sections railway lines in an engineering workshop or at any location, and an advantage of such vibration apparatus and equipment according to the invention is that it can be constructed as a portable kit, and such vibrating equipment can be easily transported to where the railway line requires aluminothermic welding to take place.

Wherein the aforegoing reference has been made to integers or components having known equivalents, then such equivalents are herein incorporated as if individually set forth. Accordingly, it will be appreciated that changes may be made to the above described embodiments, variants, and alternatives of the process and other aspect so the present invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A thermite welding process for joining aligned and adjacent sections of a railway line, the process including mounting a suitable thermite welding mould about suitably aligned and prepared sections of railway line to be welded together, and sufficiently sealing the mould so as to prevent run out, the steps of the process including:
   a.) configuring and attaching a vibration apparatus on the railway line such that a vibration means is mounted on a section of railway line at a suitable distance from the weld area, and vibrating the line at a suitable frequency of vibration and amplitude of vibration, such vibration being induced on the railway line being preset and/or adjustable during the welding process by a vibration control means configured and adapted to measure the frequency of vibration and the amplitude of vibration being applied to the line, the control means being adapted to allow adjustments to the frequency of vibration and the amplitude of vibration, and wherein the vibration apparatus includes a vibration means being a motor having eccentric weights applied to the shaft of the motor, the motor being clampable to a section of railway line adjacent the weld area and being arranged, in use, so as to allow vibration to be induced on the railway line;
   b.) welding the sections of railway line together using a thermite welding process including preheating the weld area to a suitable temperature, igniting the ignitor means to cause a reaction in the mould and allow molten steel to fill a weld area about and between the sections of railway line in the mould; and
   c.) continuing to apply vibration to the sections of railway line and the weld area for a period of time sufficient to allow the weld area to solidify and stabilize and until stress relieving of the weld area has occurred.

2. A thermite welding process according to claim 1 wherein in step a. the vibration frequency is set between about 50 to 800 Hertz.

3. A thermite welding process according to claim 1 wherein in step a. the vibration frequency is set between about 70 and 80 Hertz.

4. A thermite welding process according to claim 1 wherein the frequency of vibration is measured by a tachometer means being releasably attachable to the railway line.

5. A thermite welding process according to claim 4 wherein the amplitude of vibration is measured by an accelerometer means being releasably attachable to the railway line, the tachometer means and the accelerometer means being adapted to provide feedback signals to the vibration control means.

6. A thermite welding process according to claim 5 wherein the vibration apparatus includes a temperature measurement means to measure the temperature of the railway line.

7. A thermite welding process according to either claim 1 or claim 2 wherein the vibration frequency is set at an amplitude of vibration of substantially about 1 millimeter per second.

8. A thermite welding process according to either claim 1 or claim 3 wherein in step c. the period of vibration applied to the weld area is up to about 25 to 30 minutes after solidification of welding material in the weld area.

9. A thermite welding process according to claim 1 wherein the vibrating means is mounted to the railway line at a distance of between about 1meter to about 1.2 meters from the weld area.

10. A thermite welding process according to claim 1 wherein the preliminary step the ends of the sections of railway line are prepared by using a gas torch to cut a substantially square cut and suitably aligned to form a gap of between 25 to 40 millimeters between the end faces of the sections of railway line.

* * * * *